United States Patent
Kumar et al.

(10) Patent No.: US 7,444,944 B2
(45) Date of Patent: Nov. 4, 2008

(54) MULTIPLE ENGINE HYBRID LOCOMOTIVE

(75) Inventors: Ajith Kuttannair Kumar, Erie, PA (US); Robert D. King, Schenectady, NY (US); Chi-Houng Eddie Lu, Erie, PA (US); Leonard Michael Hill, Erie, PA (US)

(73) Assignee: General Electric Company, Schenectady, NY (US)

( * ) Notice: Subject to any disclaimer, the term of this patent is extended or adjusted under 35 U.S.C. 154(b) by 356 days.

(21) Appl. No.: 11/153,643

(22) Filed: Jun. 15, 2005

(65) Prior Publication Data

US 2006/0283350 A1    Dec. 21, 2006

(51) Int. Cl.
*B61C 1/00* (2006.01)
*B61C 3/00* (2006.01)

(52) U.S. Cl. .................... 105/26.05; 105/50

(58) Field of Classification Search ............. 105/26.05, 105/34.2, 35, 49, 50, 61.5, 73
See application file for complete search history.

(56) References Cited

U.S. PATENT DOCUMENTS

| | | | |
|---|---|---|---|
| 1,377,087 A | 5/1921 | Manns | |
| 5,847,520 A | 12/1998 | Theurillat | |
| 5,945,808 A | 8/1999 | Kikuchi et al. | |
| 6,308,639 B1 | 10/2001 | Donnelly et al. | |
| 6,612,246 B2 * | 9/2003 | Kumar | 105/34.2 |
| 2002/0174798 A1 | 11/2002 | Kumar | |
| 2004/0174125 A1 | 9/2004 | Wilton | |

\* cited by examiner

*Primary Examiner*—S. Joseph Morano
*Assistant Examiner*—Robert J McCarry, Jr.
(74) *Attorney, Agent, or Firm*—Robert Wawrzyn, Esq.; Terry M. Sanks, Esq.; Beusse Wolter Sanks Mora & Maire, P.A.

(57) ABSTRACT

A hybrid power locomotive system has a plurality of combustion engines for driving a plurality of electric power generators that supply electric power to at least one traction battery. The battery is connected to supply power to a plurality of electric traction motors coupled in driving relationship to respective ones of a plurality of wheel-axle sets of the locomotive. At least one traction motor drive is connected for controlling power to the electric traction motors. An electric power controller is arranged for coupling electric power from the power generators to the battery and senses the available energy in the battery and the power demand from the traction drives for activating selected ones of the plurality of combustion engines for charging the battery.

11 Claims, 7 Drawing Sheets

MULTIPLE ENGINE HYBRID LOCOMOTIVE

TECHNICAL FIELD

The invention relates to the field of locomotives and, more particularly, to locomotives powered by electric traction motors in which electric power is supplied to the motors by batteries charged by a generator driven by a fuel powered engine.

BACKGROUND ART

Existing railroad locomotives are typically powered by diesel electric systems in which a diesel engine drives an electric generator to produce electric power to energize electric motors which propel the drive wheels of the locomotive. Recently, there has been an increased interest in creating a modified locomotive in which electric power is supplied by an energy storage device such as a battery that is connected to be charged by a generator on an as needed basis using a fuel powered engine such as a diesel engine, gas turbine, Liquid Natural Gas (LNG) engine, gasoline engine, or even a hydrogen fueled Internal Combustion Engine (ICE). Such an approach is known in the automobile industry as a "hybrid" vehicle. These hybrid vehicles have the advantage of increased fuel efficiency and reduced pollution.

One attempt to create a hybrid locomotive is disclosed in U.S. Pat. No. 6,308,639 (the '639 patent). The '639 patent discloses a locomotive in which a gas microturbine generator provides recharging current for a battery. The disclosed locomotive has a conventional traction drive using a plurality of electric traction motors each coupled in driving relationship to a respective one of the driven axles of the locomotive. A traction power controller controls the traction motors using power from an on-board battery. A generator driven by the gas microturbine is electrically connected to the battery for maintaining the battery in a charged state. The generator and associated gas turbine is controlled in response to the state of charge of the battery. FIG. 1 illustrates the power system of the '639 patent in which a locomotive wheels 12 are driven by electric traction motors 14. Electric power for the traction motors is supplied by storage battery 16 and controlled by traction power controller 18 which may use pulse width modulation to regulate power in response to operator throttle and direction information. Battery 16 is charged by a microturbine generator 22 which comprises a gas microturbine 24 coupled to alternator 26. The control of the microturbine generator is handled by an onboard PLC 30 (programmable logic controller) which monitors the state of the battery charge, the ambient temperature and has a clock/calendar for battery equalization. As the battery approaches its gassing voltage, which represents a high state of charge, the microturbine generator shuts down. Conversely, as the charge of battery 16 drops below a certain level the microturbine is started. A high state of charge will occur only for battery equalization maintenance when all the cells are brought up to full charge. Thus, the microturbine 24 is sized so that it will run under a constant load at the maximum power output for a sustained period of time. Auxiliary loads draw from the battery charge source at a nominal 600 V DC which is converted by an inverter 32 to 480 V AC to run the locomotive's air compressor 34, traction motor blowers 36 and a 75 V battery charger 38, which is used to charge a 64V battery for powering controsl and lighting.

The system disclosed in the '639 patent is designed for yard switcher locomotives which do not require long term sustained power but rather have short term power requirements that permit the continual recharging of the battery to be done by a relatively small generator. The ratio of the energy storage capacity of the storage battery 16 to the charging power source 22 is important to minimize the cost, fuel consumption and emission of pollutants of the microturbine 24. The ratio of energy storage in kwH to the charging power in kW can be expressed as a number of hours. The optimum performance of the disclosed system is stated to be an 8 hour charging rate period or longer, representing a maximum of 125 kW of charging power per 1000 kwH of battery storage. Ideally the microturbine in these situations will be operating continuously for a period of at least ½ hour, and preferably without stopping, i.e., continuously for 100 hours or more.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
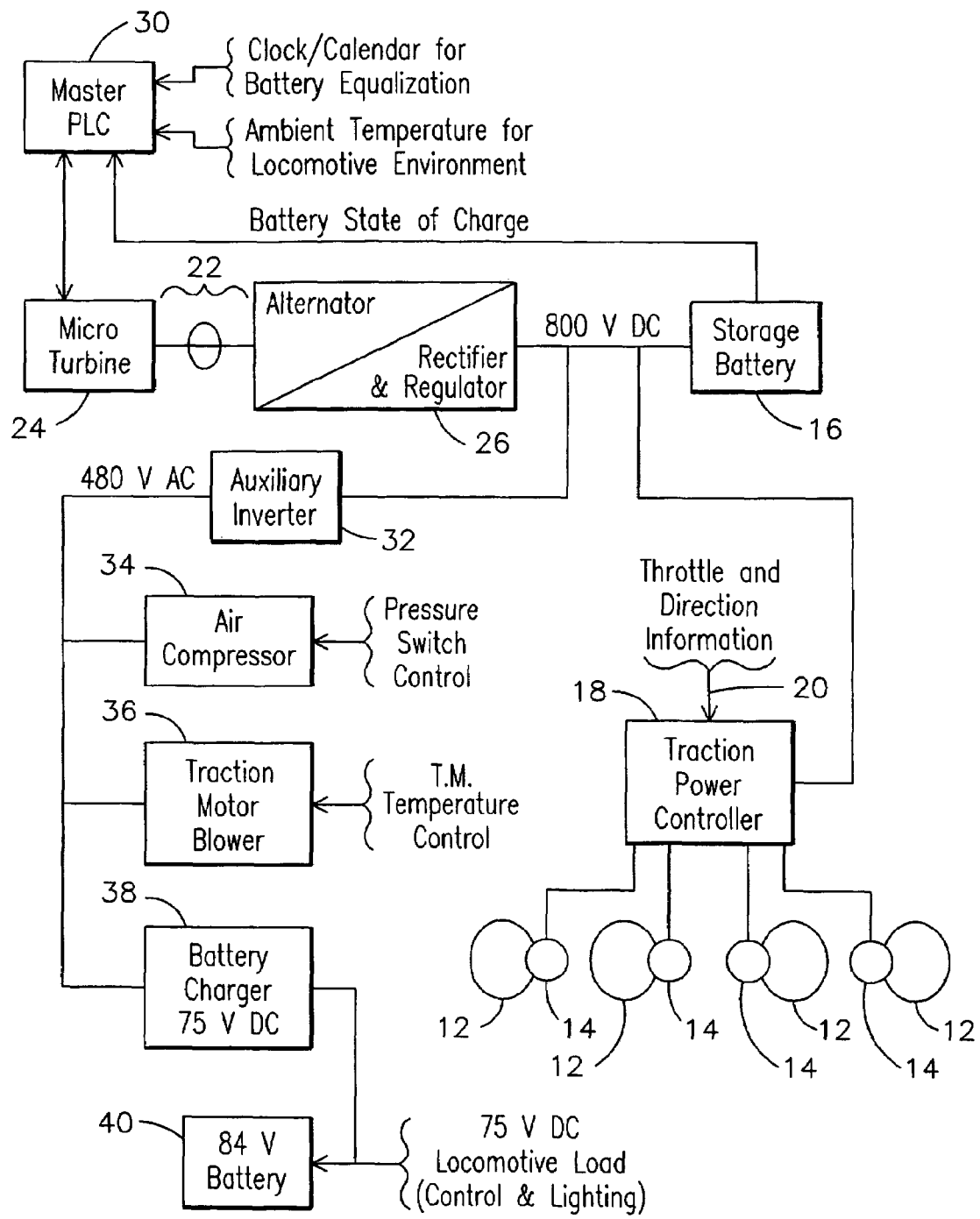
FIG. 1 illustrates a prior art hybrid locomotive power system.
Figure 2:
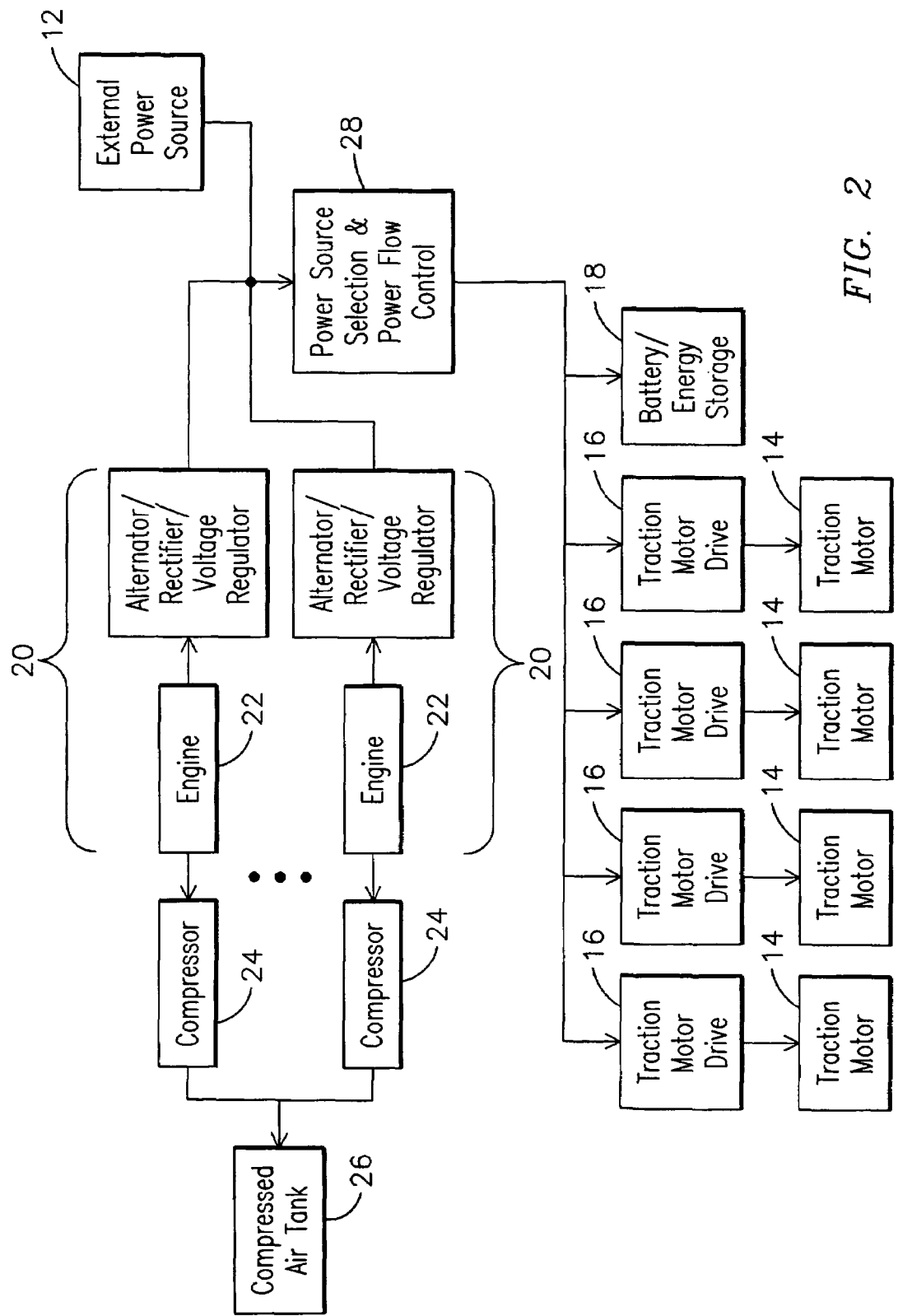
FIG. 2 is a block diagram of a hybrid locomotive power system in one form of the present invention.

Referring to FIG. 2 there is shown a simplified illustration in block diagram format of one form of the present invention. It will be appreciated that all the elements of FIG. 2 with the exception of the block 12, indicating an external power source, are part of a locomotive. The locomotive, not shown, may be a yard switcher or other short haul road locomotive having a plurality of driven axles fixed to wheels of the locomotive. Typically, the locomotive includes trucks on which a pair or more of axles are mounted. Further, it is common to have a separate electric traction motor for each driven axle of the locomotive although other arrangements such as one motor per truck or one motor per control are also known. In FIG. 2, the locomotive is shown as having four electric traction motors 14 although other numbers are also common. Each motor 14 is controlled by a separate corresponding traction motor drive 16. The drives 16 may be PWM, chopper or phase control, all of which are well known in the art. Electric power is supplied to the motors 14 via drives 16 from an energy storage device 18, which may be a battery or any other suitable energy storage system. The traction drive 16 may be arranged in a one-to-one ratio with a respective traction motor or each arranged to provide power to defined groups of motors, such as all motors on one truck.

The device 18 is charged and recharged from a system of power generators shown as a plurality of alternator/rectifier/ voltage regulator units 20. Each of the units 20 is driven by a respective fueled combustion engine 22, such as a small diesel engine or gas turbine. As indicated, there are a plurality of such engine/generator units and the number of such units may be selected depending upon the particular range of activities to be carried out by the locomotive. Note that each engine 22 may also be connected in driving relationship to a corresponding air compressor 24 for maintaining air pressure in a compressed air tank 26 common to all the compressors. The engine 22 may also be connected to other auxiliary loads. The electric power output of each alternator unit 20 is coupled to a power source selection and power flow control block 28. The control block 28 sums the power from all sources and/or selects the power source, including power from external source 12, and applies the power to energy storage device 18. Control block 28 also senses the energy demand from the traction motors and the state of charge of device 18 to determine when and how many of the engines 22 are to be activated to charge device 18.

Figure 3:
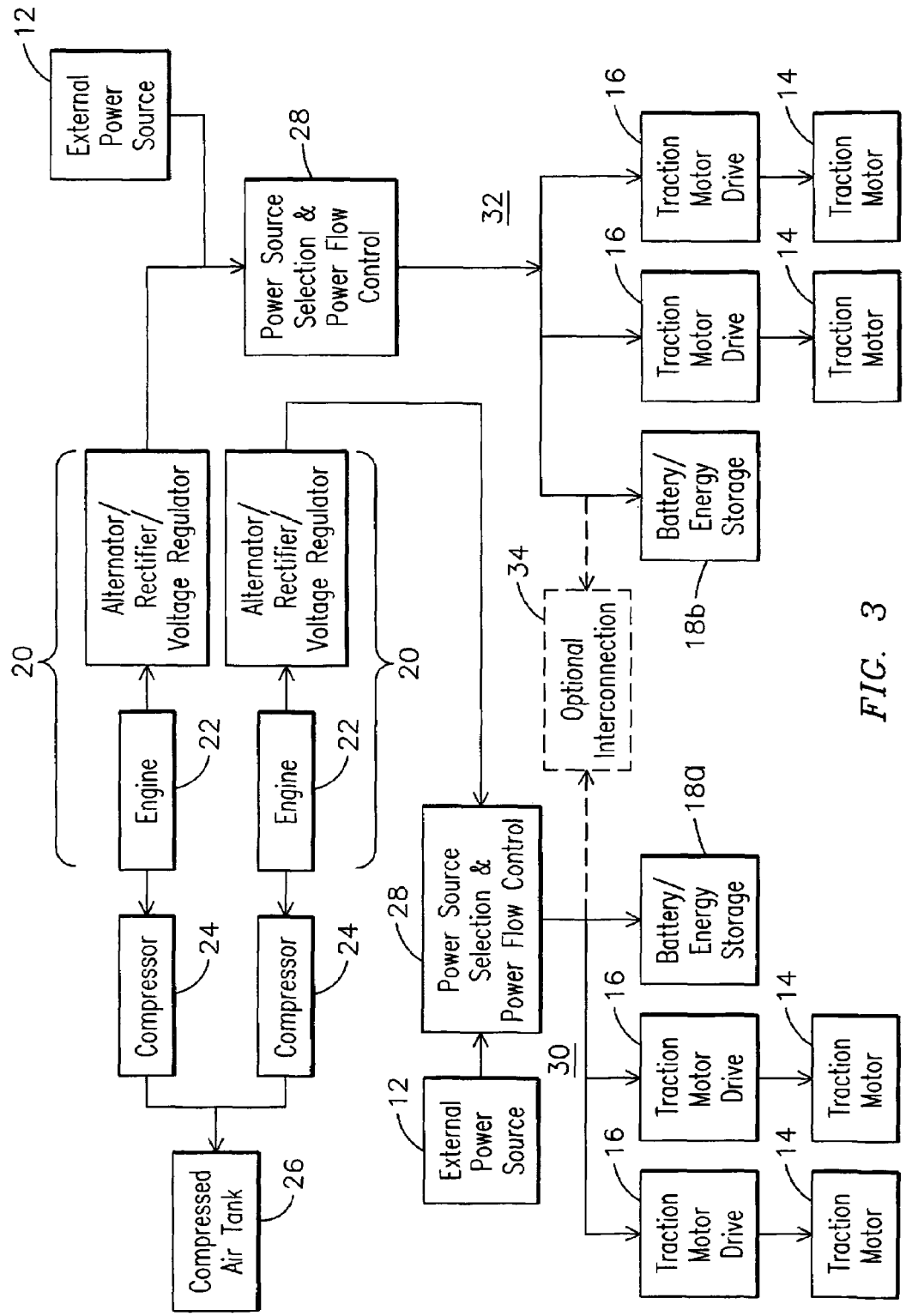
FIG. 3 is a block diagram of a hybrid locomotive power system in a second form of the present invention.

An alternate embodiment of the system of FIG. 2 is shown in FIG. 3. In this alternate embodiment, the traction motors 14 and associated drives 16 are grouped in separate units 30, 32. The units may be all motors on one truck of the locomotive or some other selected arrangement. In this embodiment, each unit 30, 32 has its own energy storage device 18*a*, 18*b* and each device 18*a*, 18*b* is charged from a separate one of the engines 22 via a separate one of the power flow control blocks 28. External power source 12 is coupled to each of the control blocks 28. It is also contemplated that there may be provided an interconnection 34 between the energy storage devices 18*a*, 18*b* to allow energy transfer in the event of a system fault in one power unit. It is also contemplated that the system could be arranged so that each axle has a separate rechargeable energy storage device and that each energy storage device could be rechargeable from an independent engine/alternator unit or groups of devices could be recharged from one common unit.

Figure 4:
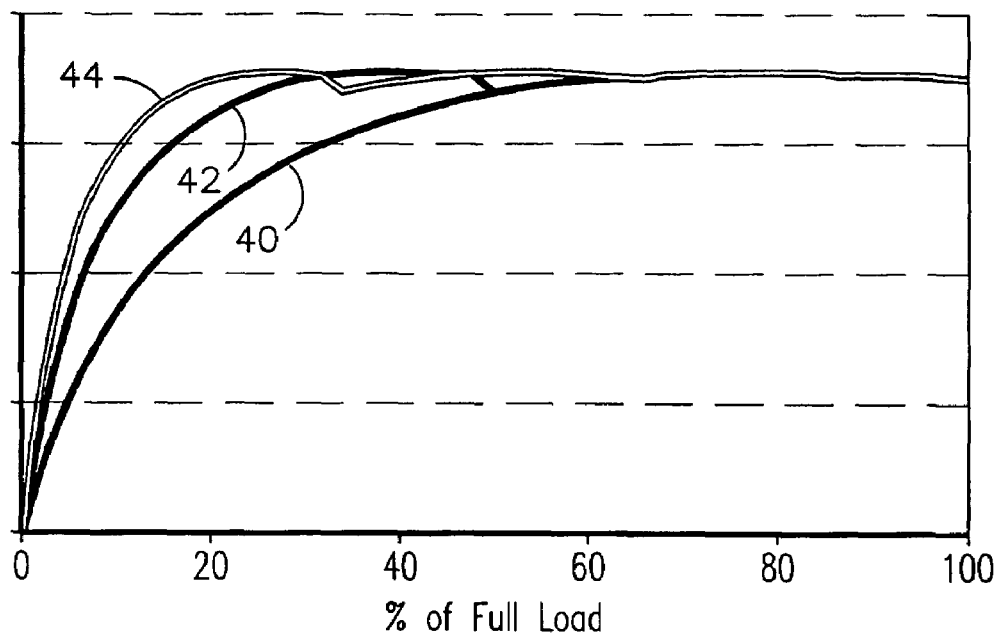
FIG. 4 illustrates the efficiency comparison for implementation of the hybrid locomotive using a large single, APU, dual APU's each rated at 50% of total rated power, and three APU's, each rated at 33% of total rated power.

Turning now to FIG. 4, there is shown a graph of engine/alternator efficiency as a function of percent full load. Assuming that the full load is 100 kilowatts (100 kw), a single engine/alternator combination produces the efficiency curve indicated at 40. It can be seen that efficiency does not reach a maximum until the load reaches above 60 percent. If the single engine/alternator is replaced by two units each producing 50 kw, the efficiency curve appears as shown at 42 where maximum efficiency is reached at less than 40 percent of full load. Adding an additional engine/alternator unit with each having full load capacity of 33 kw results in an efficiency curve approximating the curve 44 where maximum efficiency is achieved at a load of about 20 percent of full load. Moreover, this higher efficiency is maintained over a wider range of loads. The advantage of having multiple lower power engines goes beyond the efficiency and also results in lower emissions. Further, in a battery charging cycle, emissions may be further reduced by reduction in battery charging time.

Figure 5:
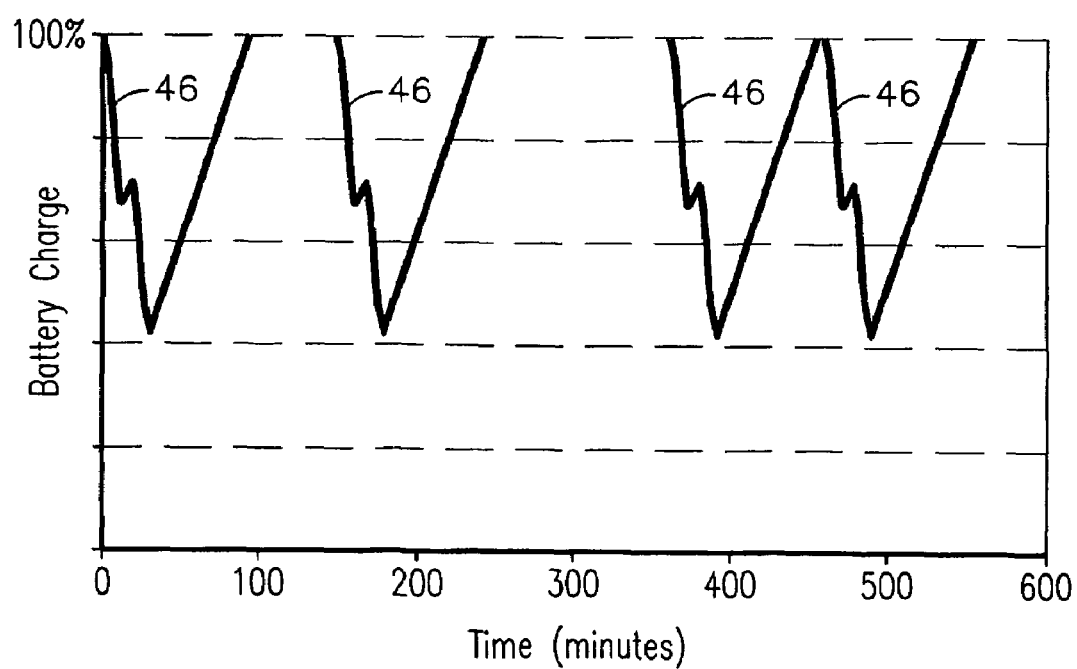
FIG. 5 illustrates normal operation of the hybrid locomotive.

FIG. 5 illustrates an ideal charge/discharge schedule for a hybrid locomotive battery. Battery charge is indicated on the Y or vertical axis while time is represented along the X or horizontal axis. In each charge/discharge cycle indicated by the reference 46, the battery discharges down to about 40 percent of full charge and is then recharged over some time period back to the full charge condition. In other words, each of the locomotive missions is of short duration, approximately 40 minutes in the illustrative example, and the battery charge rate is uniform to recharge the battery in about 60 minutes. In this example, a single engine/alternator combination is sufficient to maintain performance of the locomotive.

Figure 6:
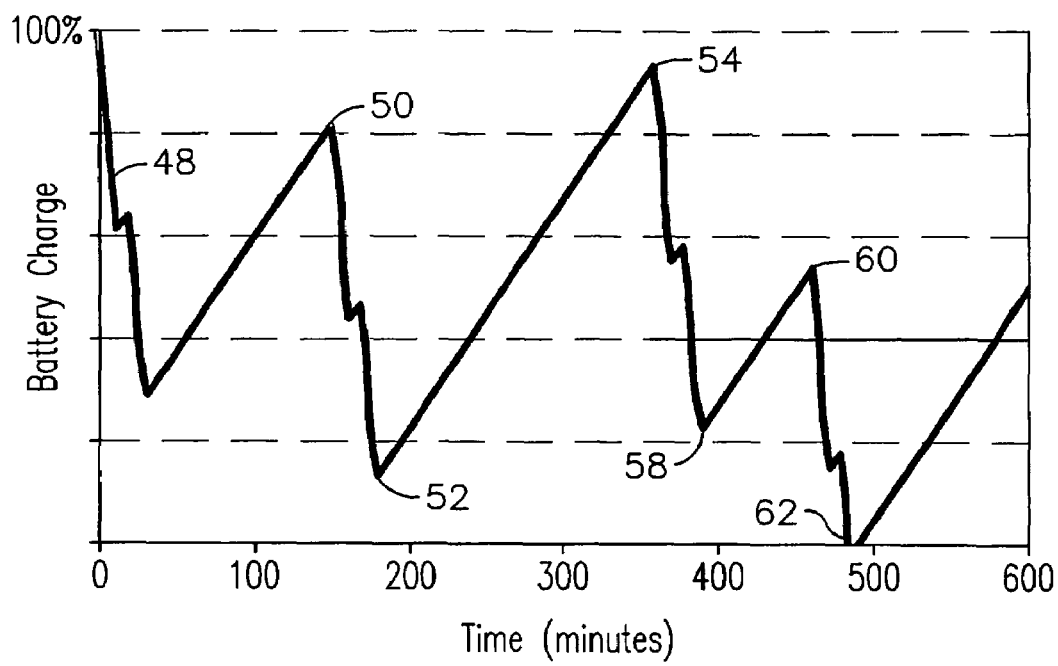
FIG. 6 illustrates operation of the hybrid locomotive with APU failure.

Unfortunately, all locomotive missions are not ideal. FIG. 6 illustrates the results of repeated missions without allowing the battery to become fully recharged. This could be due to a failure in the power source (therefore reduced capacity to charge) or due to heavier load. As shown by the graph at 48, the first mission discharges the battery down to about 30 percent and the battery only reaches about 80 percent charge before the next mission begins at 50. The battery discharges down to about 15 percent charge at 52 before starting the recharge cycle. Although there is a long time period between the end of the mission at 52 and the start of the next mission at 54, the battery still does not reach a full charge state before the next mission starts. This mission discharges the battery down to about 20 percent at 58 but there is only a short charge cycle until the next mission starts at 60. This last mission depletes the battery charge down to zero resulting in mission failure at 62. At this point, the locomotive is out of service and needs an extensive time for the battery to recover using the single engine/alternator combination.

Figure 7:
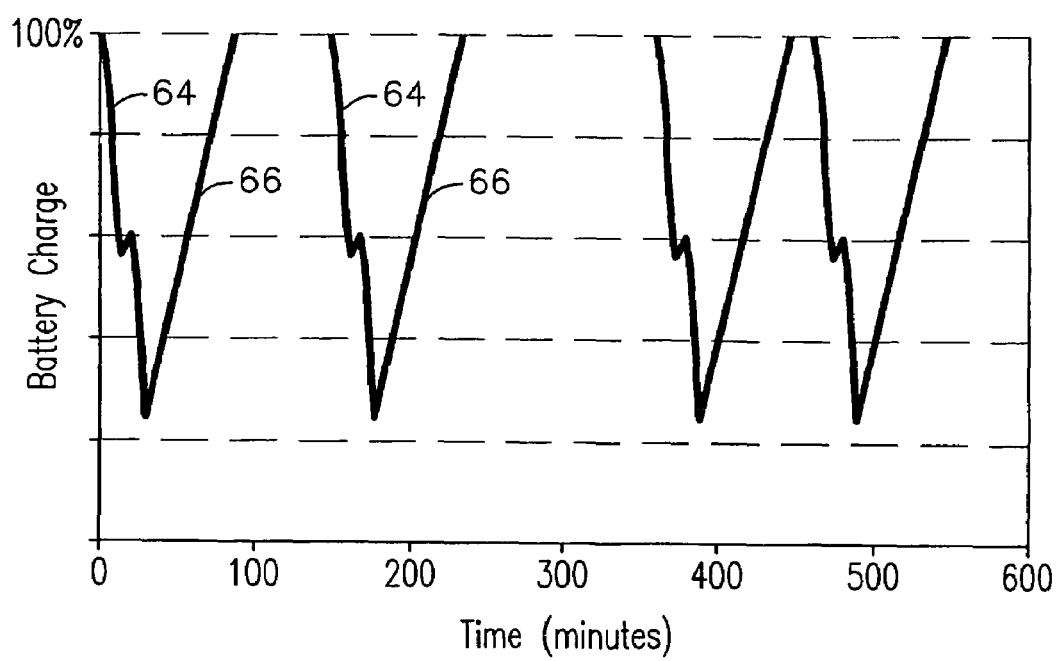
FIG. 7 illustrates operation of the hybrid locomotive with increased APU rated capacity.

FIG. 7 illustrates one of the advantages of a multiple engine/alternator system for a hybrid locomotive. In this example, the battery discharge rate at 64 is shown as higher than that of FIG. 6 and the recharge rate at 66 is much higher due to the added capacity of multiple engine/alternator charging units. Accordingly, even though the discharge cycles are higher than that of FIG. 6, the recharge rate is large enough to allow the battery to be completely charged between each discharge event or mission. If the recharge rate was not increased, all the missions could not be completed.

It will be recognized that the engine/alternator units such as units 20 of FIG. 2 will be actuated whenever the stored energy drops below some preset level. This assures that at least some of the energy used by the locomotive is replenished by the units 20 during the discharge cycle. Alternately, one can consider the system of FIG. 2 as under designed for the available power from the engine/alternator units. For example, if the locomotive requires 2000 HP and, assuming a three engine/alternator design, the available traction power from the units 20 is only 400 HP per unit for a total of 1200 HP, the shortfall of power must be made up by the energy storage system, either rechargeable batteries or flywheel or capacitor storage. If there are only two engine/alternator units, the shortfall is greater (unless the engine capacity is increased with a sacrifice of efficiency) and the locomotive may be able to produce the same power for a shorter time period and may require a longer time period to recharge the energy storage device.

Figure 8:
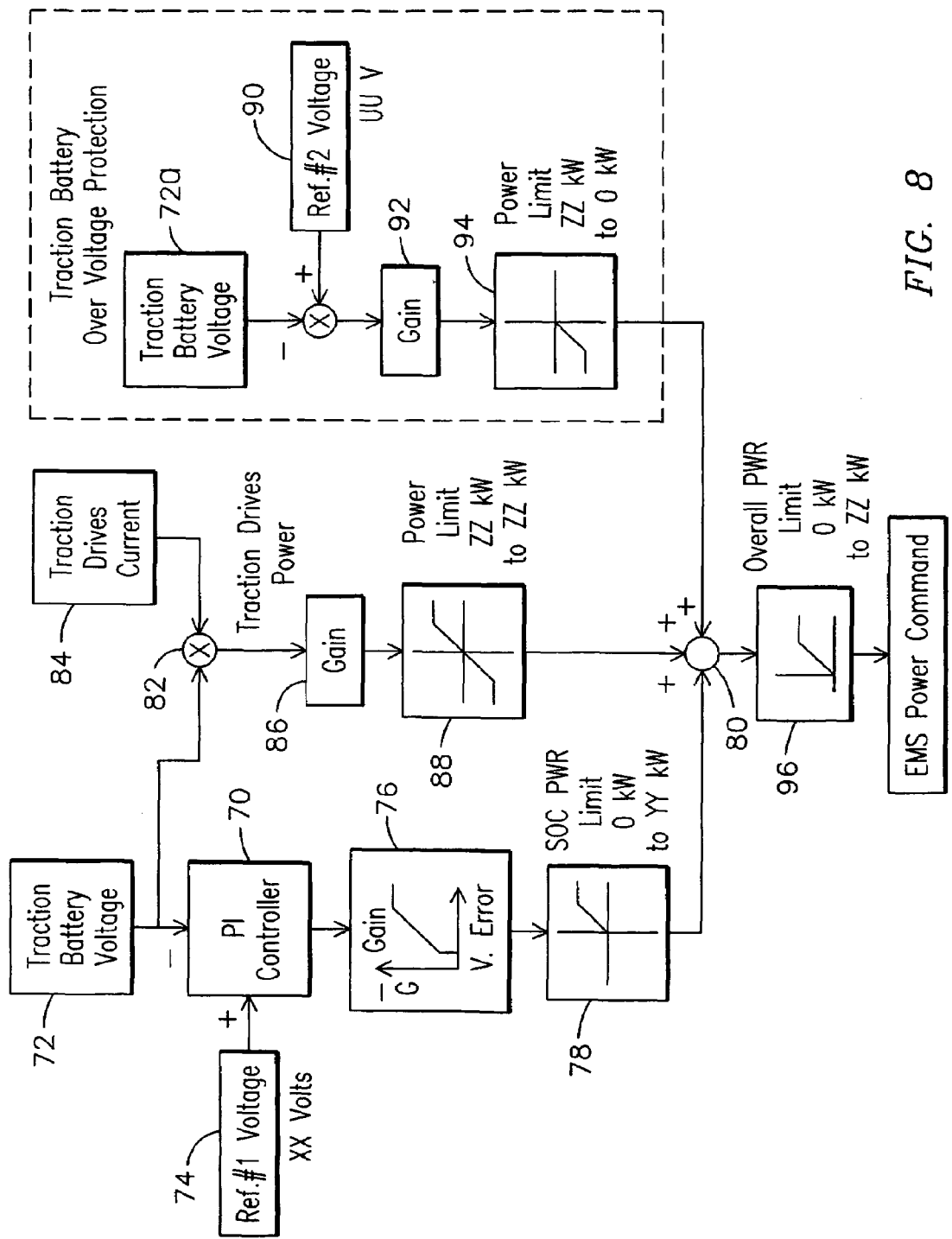
FIG. 8 is a block diagram of the hybrid locomotive energy management system sensor signals and power control.
Figure 9:
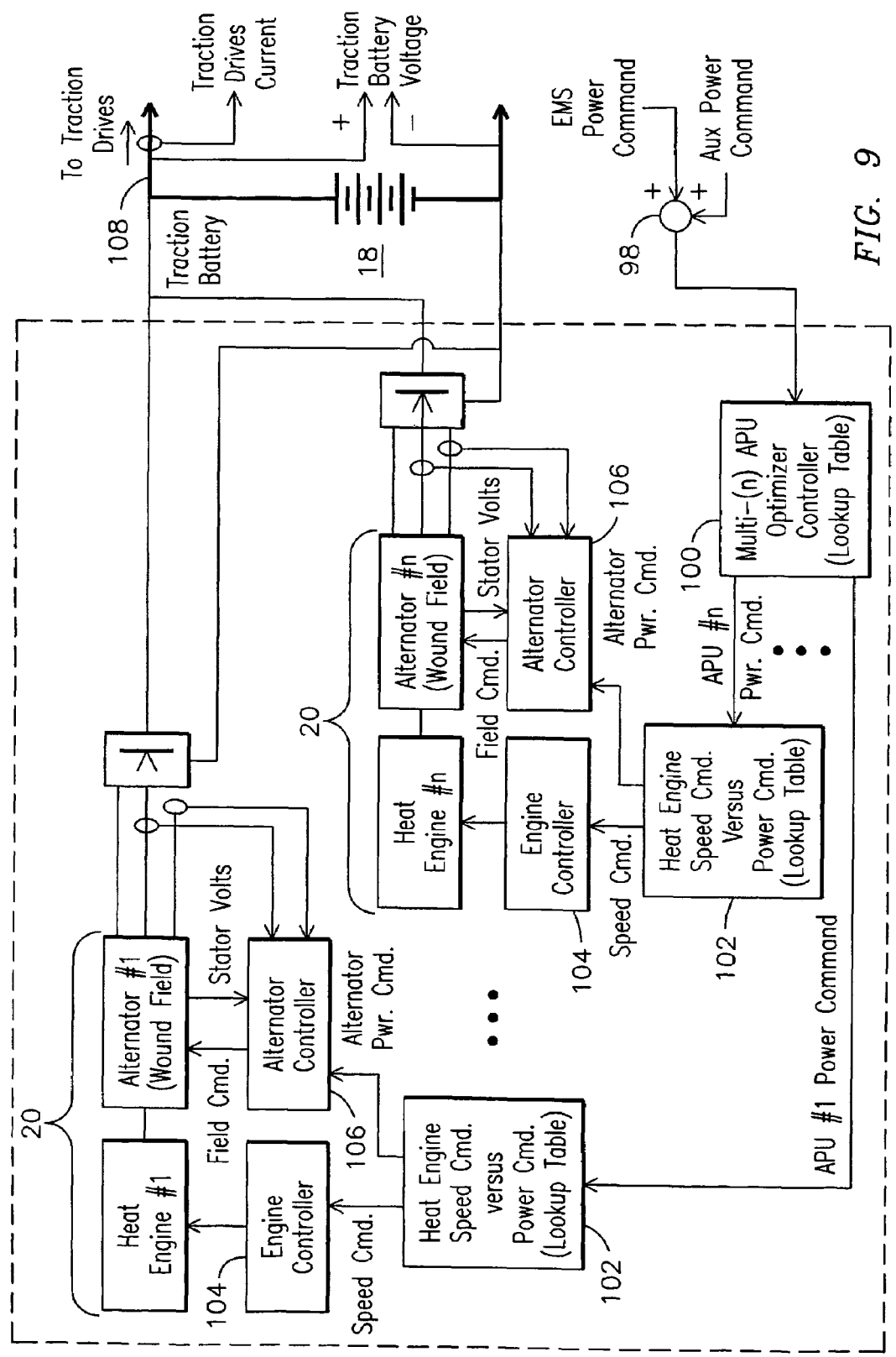
FIG. 9 is a block diagram of the hybrid locomotive APU power control.

FIGS. 8 and 9 illustrate one control scheme for the multiple engine/alternator system of FIG. 2. Referring first to FIG. 8, there is shown a conventional proportional plus integral (PI) controller 70 responsive to a signal from traction battery voltage monitor 72 and a reference voltage from block 74 to create an error signal for application to a voltage gain/voltage error block 76 of a type well known in the art. The amplified error signal from block 76 is then applied to voltage limit block 78 and the resulting value limited signal from block 78 is then coupled to summing junction 80. The battery voltage signal from block 72 is also applied to multiplier circuit 82 where it is multiplied by the value of traction motor current from monitor block 84. The result is the power applied to the traction motors. After processing through an appropriate gain circuit, block 86, and a power limit circuit, block 88, the power signal is applied to summing junction 80 for summing with the error signal from block 78. At the same time, battery voltage, block 72*a*, is compared to a reference voltage from block 90 and then processed through an appropriate gain circuit, block 92, and a power limit circuit, block 94, and also coupled to summing junction 80. The blocks 72*a*, 90, 92 and 94 make up a traction battery overvoltage protection circuit to prevent overcharging of the battery. The output from summing junction 80 is passed through a power limit block 96 and becomes the power command signal, referred to as the EMS Power Command signal, for controlling actuation of the engine/alternator units 20 and is applied to the system of FIG. 9.

FIG. 9 illustrates one form of control system for a multiple engine/alternator hybrid locomotive. The EMS signal from FIG. 8 is summed at junction 98 with an auxiliary power command (generated in a conventional manner to represent the demand for auxiliary power to run systems coupled to the locomotive other than the traction power for the drive motors) to create a total power demand. This signal is coupled to a microprocessor based controller 100 which is programmed to optimize operation of the locomotive systems by selectively actuating the engine/alternator units 20. The processor may use a look-up table or other algorithm to determine when and for how long each engine/alternator unit will be active. Each unit 20 includes a controller 102 which converts the power command signal from the controller 100 into corresponding speed commands for the engine and power out commands for the alternator. The respective speed and power commands are applied to corresponding speed control blocks 104 and alternator regulator blocks 106. The output power from each alternator is summed at the traction battery 18 and applied to the locomotive traction power bus 108.

What is claimed is:

1. A hybrid power locomotive system in a unitary locomotive, the locomotive having a plurality of electric traction motors coupled in driving relationship to respective ones of a plurality of wheel-axle sets of the locomotive, the locomotive system comprising: a plurality of combustion engines and a corresponding plurality of electric power generators each coupled to be driven by a corresponding one of the plurality of combustion engines, all of the engines and generators being fixed in the unitary locomotive; at least one traction motor drive connected for controlling power to the electric traction motors of the unitary locomotive; an electric power storage device coupled to supply electric traction motor power to the traction motor drive; an electric power controller arranged for coupling electric power from the power generators to the electric power storage device, the power controller sensing the available energy in the power storage device and the power demand from the traction drives for activating selected ones of the plurality of combustion engines for charging the power storage device, the traction motors being powered only through the power storage device.

2. The hybrid power locomotive system of claim 1 and including a separate traction motor drive for each of a defined group of traction motors.

3. The hybrid power locomotive system of claim 2 wherein each group of traction motors comprises one or more motors.

4. The hybrid power locomotive system of claim 3 wherein the energy storage device comprises a plurality of devices, each of the devices being coupled to supply electric power to selected ones of the traction motor drives and to receive power from each of the power generators.

5. The hybrid power locomotive system of claim 2 wherein the energy storage device comprises a traction battery.

6. The hybrid power locomotive system of claim 2 wherein the energy storage device comprises an ultracapacitor, flywheel, or a combination of with a traction battery and ultracapacitor or flywheel.

7. The hybrid power locomotive system of claim 1 and including an energy management system power control comprised of a controller using sensed voltage of the energy storage unit and a traction motor power demand to control selective operation of the combustion engines.

8. A hybrid power locomotive system comprising: a plurality of combustion engines; a plurality of electric power generators each coupled to be driven by a corresponding one of the plurality of combustion engines; a plurality of electric traction motors coupled in driving relationship to respective ones of a plurality of wheel-axle sets of the locomotive; at least one traction motor drive connected for controlling power to electric traction motors; an electric power storage device coupled to supply power to the traction motor drives; an electric power controller arranged for coupling electric power from the power generators to the electric power storage device, the power controller sensing the available energy in the power storage device and the power demand from the traction drives for activating selected ones of the plurality of combustion engines for charging the power storage device; a separate traction motor drive for each of a defined group of traction motors and each group of traction motors comprising one or more motors, wherein the traction motors and associated traction drives are arranged in groups of multiple motors, each group of motors having a separate energy storage device and each energy storage device being charged by a different one of the plurality of electric power generators.

9. A hybrid power locomotive system comprising: a plurality of combustion engines; a plurality of electric power generators each coupled to be driven by a corresponding one of the plurality of combustion engines; a plurality of electric traction motors coupled in driving relationship to respective ones of a plurality of wheel-axle sets of the locomotive; at least one traction motor drive connected for controlling power to electric traction motors; an electric power storage device coupled to supply power to the traction motor drives; an electric power controller arranged for coupling electric power from the power generators to the electric power storage device, the power controller sensing the available energy in the power storage device and the power demand from the traction drives for activating selected ones of the plurality of combustion engines for charging the power storage device; an energy management system power control comprised of a controller using sensed voltage of the energy storage unit and a traction motor power demand to control selective operation of the combustion engines, wherein the controller produces an energy management power command signal comprising the sum of: a first error representative of a difference between energy storage device voltage and a first reference voltage; a power signal representative of traction drive power demand; and a second error signal representative of a difference between traction battery voltage and a second reference signal representative of an overvoltage state.

10. The hybrid power locomotive system of claim 9 wherein the controller combines power required for auxiliary loads with traction motor power to form a total power command for the multiple power generators.

11. The hybrid power locomotive system of claim 10 wherein the power command signal is derived from a look-up table.

* * * * *